US008706743B2

(12) United States Patent
Small et al.

(10) Patent No.: US 8,706,743 B2
(45) Date of Patent: Apr. 22, 2014

(54) ALERT NOTIFICATION DISTRIBUTION TOOL

(75) Inventors: Daniel S. Small, Charlotte, NC (US); Thomas M. Keifer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 241 days.

(21) Appl. No.: 13/042,985

(22) Filed: Mar. 8, 2011

(65) Prior Publication Data

US 2012/0233169 A1    Sep. 13, 2012

(51) Int. Cl.
*G06F 17/30*    (2006.01)

(52) U.S. Cl.
CPC ................... *G06F 17/3056* (2013.01)
USPC ........................................................ 707/754

(58) Field of Classification Search
CPC .......... G06F 17/30557; G06F 17/3056; G06F 17/30076; G06F 17/30179; G06F 17/30569
USPC ................... 707/754, 756; 715/249
See application file for complete search history.

(56) References Cited

U.S. PATENT DOCUMENTS

| 7,529,850 | B2 | 5/2009 | Verma et al. ................... 709/242 |
| 7,664,233 | B1 | 2/2010 | Kirchmeier et al. ............. 379/37 |
| 2004/0128353 | A1 | 7/2004 | Goodman et al. ............. 709/204 |
| 2007/0027978 | A1 | 2/2007 | Burkman et al. ............. 709/224 |

FOREIGN PATENT DOCUMENTS

WO    WO 01/35361 A1    5/2001 ............... G08B 5/22

OTHER PUBLICATIONS

Jim Boyce, Microsoft Outlook 2010 Inside Out, Aug. 11, 2010, Microsoft Press, p. 135-138, 181-183, 436, 454, 869, 880, 883.*
Jim Boyce, Chapter 31 Moving Data in and out of Outlook with Import/Export of Microsoft Outlook 2010 Inside Out, Aug. 11, 2010, p. 1-6.*

* cited by examiner

*Primary Examiner* — Thu-Nguyet Le
(74) *Attorney, Agent, or Firm* — Michael A. Springs

(57) ABSTRACT

An alert notification distribution tool is disclosed. In particular embodiments, a method includes receiving raw data from a first data source in a first format and converting the raw data to conditioned data. The method also includes selecting, based on user input, a first category of a plurality of categories included in the conditioned data. The method also includes selecting, based on user input, one or more values from a plurality of values associated with the selected first category and generating a distribution group based on the selected first category and the selected one or more values associated with the selected first category, the distribution group including one or more contact addresses.

24 Claims, 3 Drawing Sheets

ALERT NOTIFICATION DISTRIBUTION TOOL

TECHNICAL FIELD OF THE INVENTION

The present disclosure relates to communication systems generally, and more particularly to an alert notification distribution tool.

BACKGROUND OF THE INVENTION

At times during normal business operation, events transpire that require a rapid, organized, and integrated response. Such events may include a failure of electronic systems, criminal mischief, disease pandemics, natural disasters, or other catastrophic failures of systems or processes. These events may place an organization at severe reputational or operational risk. Communication during these events is crucial to mitigating or remediating adverse effects from these events.

SUMMARY OF THE INVENTION

In accordance with particular embodiments of the present disclosure, the disadvantages and problems associated with alert notification distribution tools have been substantially reduced or eliminated.

In accordance with a particular embodiment of the present disclosure, a method includes receiving raw data from a first data source in a first format and converting the raw data to conditioned data. The method also includes selecting, based on user input, a first category of a plurality of categories included in the conditioned data. The method also includes selecting, based on user input, one or more values from a plurality of values associated with the selected first category and generating a distribution group based on the selected first category and the selected one or more values associated with the selected first category, the distribution group including one or more contact addresses.

In accordance with another embodiment of the present disclosure, a system includes a memory operable to store raw data received from a first data source in a first format. The system also includes a processor operable to convert the stored raw data to conditioned data. The processor is also operable to select, based on input received from a client, a first category of a plurality of categories included in the conditioned data and select, based on input received from the client, one or more values from a plurality of values associated with the selected first category. The processor is also operable to generate a distribution group based on the selected first category and the selected one or more values, the distribution group including one or more contact addresses.

In accordance with yet another embodiment of the present disclosure, a non-transitory computer readable medium includes logic, and the logic is operable, when executed on a processor to receive raw data from a first data source in a first format and convert the raw data to conditioned data. The logic is further operable to select, based on input received from a client, a first category of a plurality of categories included in the conditioned data. The logic is also operable to select, based on input received from the client, one or more values from a plurality of values associated with the selected first category. The logic is also operable to generate a distribution group based on the selected first category and the selected one or more values, the distribution group including one or more contact addresses.

Technical advantages provided by particular embodiments of the present disclosure include generating distribution groups more efficiently and with accurate information as compared with previous systems or methods. As a result, particular embodiments may enable a user to provide a rapid communication response to events. In some embodiments, a system may offer a dynamic query process to produce real time distribution groups. Previous distribution group tools or systems may have required the creation of static lists of information. Static lists of information will tend to become obsolete over time as users move or leave the organization and/or as new users join the organization. Thus, criteria that was used to establish the static lists may no longer apply in the current environment. Additionally, static lists are very labor intensive to create and maintain. Moreover, flexibility does not exist to create distribution groups according to specific and varying parameters. Creating distribution groups in real time in accordance with particular embodiments of the present disclosure, however, may ensure accuracy of information, a correct targeted audience, and efficiency. In particular, utilizing particular embodiments of the present disclosure, distribution groups may be generated with the most recent information available for users within the organization and the structure of the organization itself. Additionally, distribution groups can be targeted to specific users that require the information. Utilizing particular embodiments, distribution groups may be created with the most recent information in a shortened period of time. Particular embodiments may also facilitate accurate and timely communication in organizations that include large memberships spread across various functions, geographic locations, or organizations. Particular embodiments of the present disclosure may also enable users to create distribution groups that include targeted users that have a specific organizational role, title, location, or function. In addition, particular embodiments provide accurate and timely distribution group creation where manual updates to maintain accuracy is impractical. Moreover, in particular embodiments, a user may find the filtered list of contacts from your category selections. This becomes a valuable way to use the tool when a need to find a unique group of people arises. For example, if a user wanted to find out all associates that work in building 1234 in New York, the user could use the filtering process to find those particular contacts. This might be useful to ensure everyone is accounted for in a building evacuation. Thus, particular embodiments may have the potential to save lives in cases of emergency. Additionally, particular embodiments of the present disclosure may be used to find people in certain job titles that need to take specific training. In general, particular embodiments may enable users to locate other persons in an organization based on selectable and customizable categories and values. As a result, particular embodiments of the present disclosure may provide numerous technical advantages. Particular embodiments the present disclosure may provide some, none, all, or additional technical advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
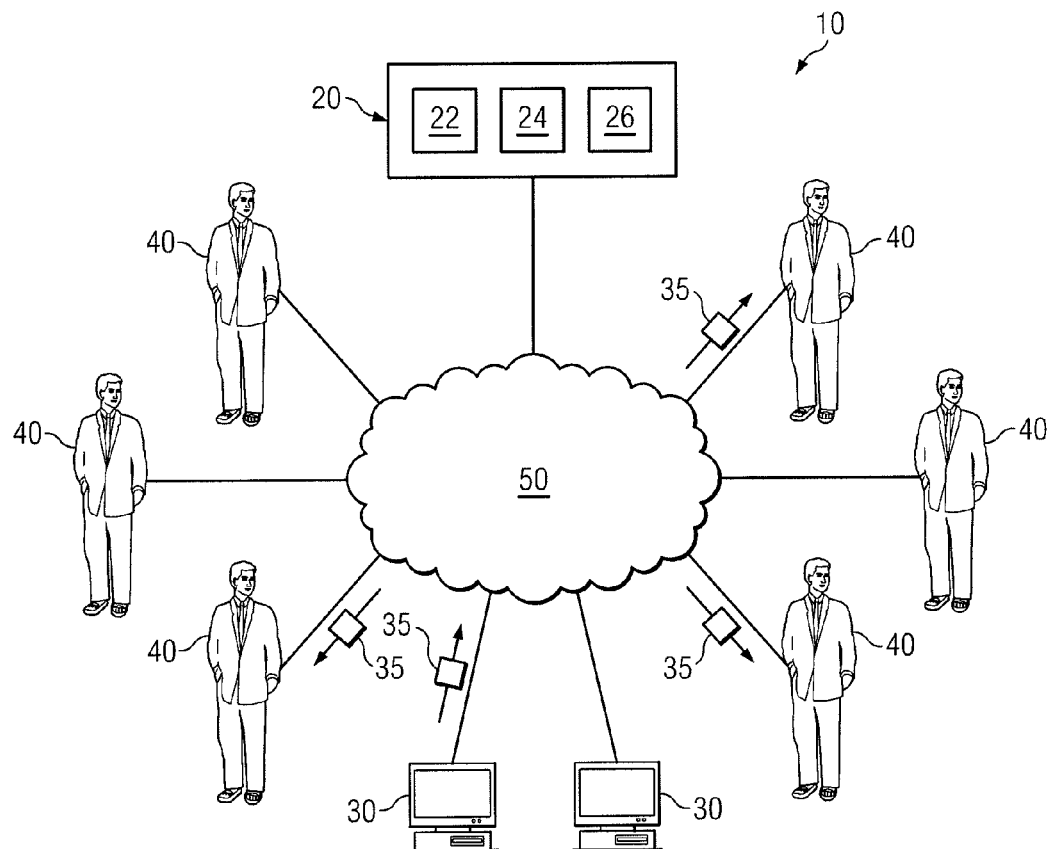
FIG. 1 illustrates an alert distribution system according to particular embodiments of the present disclosure.

A system and method for an alert notification distribution tool is disclosed. FIG. 1 illustrates an alert distribution system 10 that includes distribution server 20, clients 30, and users 40. In particular embodiments, alert distribution system 10 enables the efficient and rapid creation and maintenance of distribution groups based on data provided to distribution server 20. In particular embodiments, distribution groups 26 for distributing messages 35 to users 40 may be created dynamically based on information received and processed by distribution server 20 and/or client 30.

Distribution server 20 receives data containing information associated with users 40. In particular embodiments, distribution server 20 may receive raw data 22 based on user input, from a human resources database, and/or from any other suitable source. Raw data 22 is data associated with users 40 in an organization. Raw data 22 may be compiled or stored in a human resources database, and may be used to maintain information and demographic, location, and/or organization information on a user. However, in some embodiments, raw data 22 contains more data than is necessary to generate distribution group 26, may be in a non-optimal format, or may be unsuitable in other ways. Raw data 22 may be received at distribution server 20 weekly, daily, or on an as-needed basis. In certain embodiments, distribution server 20 converts raw data 22 to conditioned data 24 to enable further processing in alert distribution system 10. Distribution server 20 may generate conditioned data 24 based on received raw data 22. Conditioned data 24 may include information associated with one or more users 40, including, but not limited to, name, office location, geographical location(s), title, organizational role, telephone number, a contact address (such as, for example, an email address), and/or any other information associated with user 40. In particular embodiments, distribution server 20 represents a mainframe computer system that receives and/or processes data associated with particular users 40. In some embodiments, distribution server 20 may comprise a general-purpose personal computer (PC), a Macintosh, a workstation, a Unix-based computer, a server computer, or any suitable processing device. In general, however, distribution server 20 may include any appropriate combination of hardware, software, and/or encoded logic suitable to perform the described functionality. Moreover, the functions and operations described above may be performed by a pool of distribution servers 20.

Client 30 accesses conditioned data 24 and may generate distribution group 26 based on conditioned data 24. Client 30 may select one or more search fields within conditioned data 24 to generate distribution group 26. In some embodiments, client 30 may comprise a general-purpose personal computer (PC), a Macintosh, a workstation, a Unix-based computer, a server computer, or any suitable processing device. In general, however, client 30 may include any appropriate combination of hardware, software, and/or encoded logic suitable to perform the described functionality.

Users 40 (who may be individually referred to as "user 40" or collectively as "users 40") represent users within or members of an organization. Users 40 may represent employees, partners, managers, and/or any person within an organization with which the organization communicates. A particular user 40 may communicate with other users 40 and/or other components of alert distribution system 10 via electronic mail, Short Message Service (SMS) text message, telephone calls, voicemails, and/or via any another other appropriate communication method. In particular embodiments, users 40 may be geographically dispersed and/or belong to various positions or roles within the organization. For example, one particular user 40 may be an entry level clerk, another particular user 40 may be a manager, and yet another particular user 40 may be a vice president of the organization. Thus, each user 40 has associated characteristics, such as, for example, name, office location, geographical location(s), title, organizational role, telephone number, and/or contact address. These associated characteristics may be stored in a human resources database as raw data 22 and utilized by distribution server 20 to generate conditioned data 24.

Network 50 represents any number and combination of wireline and/or wireless packet-switched or circuit-switched networks suitable for data transmission. Distribution server 20 and/or clients 30 are communicatively coupled via one or more networks 50. In particular embodiments, users 40 may communicate with other users 40 via one or more computers, telephones, cell phones, or other communication devices coupled to network 50. In particular embodiments, client 30 may communicatively couple to distribution server 20 via network 50. Network 50 may, for example, communicate internet protocol packets, frame relay frames, asynchronous transfer mode cells, and/or other suitable information between network addresses. Network 50 may include one or more intranets, local area networks, metropolitan area networks, wide area networks, cellular networks, all or a portion of the Internet, and/or any other communication system or systems at one or more locations.

Modification, additions, or omissions may be made to alert distribution system 10 without departing form the scope of the present disclosure. For example, when a component of alert distribution system 10 determines information, the component may determine the information locally or may receive the information from a remote location. In the illustrated embodiment, distribution server 20 and client 30 are represented as different components of alert distribution system 10. However, the functions of distribution server 20 and client 30 may be performed by any suitable combination of one or more servers or other components at one or more locations. Additionally, distribution server 20 and client 30 may represent the same component within alert distribution system 10. In the embodiment where the various components are servers, the servers may be public or private servers, and each server may be a virtual or physical server. The server may include one or more servers at the same or at remote locations. Also, distribution server 20 and client 30 may include any suitable component that functions as a server. Additionally, alert distribution system 10 may include any appropriate number of distribution server 20 and client 30. Any suitable logic may perform the functions of alert distribution system 10 and the components within alert distribution system 10.

In an example operation of alert distribution system 10, distribution server 20 receives raw data 20. Raw data 20 may include information associated with one or more users 40. Raw data 20 may be received based on user input, downloaded from a human resources database, and/or received from any other suitable source.

Once received, distribution server 20 may convert raw data 22 to generate conditioned data 24. Converting raw data 22 may include selectively filtering sensitive data (such as, for example, salary information and/or age of user 40). Additionally, converting raw data 22 may include reformatting certain fields in raw data 22 to facilitate further processing within alert distribution system 10. For example, if names of users 40 in raw data 22 are stored as Last Name, First Name, converting raw data 22 may include storing name information in conditioned data 24 as First Name, Last Name. In some embodiments, converting raw data 22 may include selectively filtering information based on relevance. For example, a secondary contact number, or a previous address of user 24, may not be relevant to the creation of distribution group 26. In some embodiments, converting raw data 22 to generate conditioned data 24 may be customized according to particular a sub-group within an organization. For example, one sub-group may have no need to communicate with users 40 located outside the United States. Another sub-group may have no need to contact senior management. In such cases, raw data 24 distribution server 20 may filter data associated with users 40 located outside of the United States or data associated with senior management. Thus, when accessing conditioned data 24, clients 30 may access a particular set of conditioned data 24 associated with an appropriate sub-group within an organization.

Once converted, conditioned data 24 may be stored in memory on distribution server 20 and/or in any other appropriate location. In particular embodiments, distribution server 20 ages conditioned data 24 based on an amount of time conditioned data 24 has been stored. For example, distribution server 20 may retain conditioned data 24 for one week before downloading new raw data 22 and generating new conditioned data 24 based on the new raw data 22. In particular embodiments, conditioned data 24 may be archived.

Once conditioned data 24 is generated, client 30 may access conditioned data 24 to generate distribution group 26. In some embodiments, conditioned data 24 may be accessed through a user interface, as discussed further below with respect to FIG. 3. Client 30 and/or distribution server 20 may generate distribution group 26 by selecting categories of information associated with users 40 in a user interface. For example, to generate a message to all users in California, client 30 may select in a category window a field "Work State." Selecting work state may enable a user to select additional values for data that populate the "Work State" category. For example, a user interface may display all states that are populated in the "Work State" category. More than one value may be selected. Selecting "California" at this point may display all contact addresses for users 40 in California. Client 30 may select additional categories and values. For example, a user may select "Job Title" whereupon the user interface displays all values that populate the "Job Title" category, such as "Business executive," "Associate, "or "Group Operations Manager." Selecting one or more Job Titles may display contact addresses of users 40 that have the selected job title and are located in California. Additional categories and values may be selected resulting in a distribution group 26 that includes the users 40 desired to be communicated with. Distribution group 26 may be assigned a name, such as "Distribution Group California Associates 01/01/2011." In some embodiments, the created distribution group 26 may be added to a contacts manager, an email program, or other suitable application. Moreover, in certain embodiments, a distribution group 26a and distribution group 26b may be merged to form distribution group 26c. Once added to a contacts management or email application, one or more users 40 included in distribution group 26 may be removed to avoid regenerating distribution group 26.

In certain embodiments, a particular user 40 in the management or organization hierarchy may be desired to be included in distribution group 26, but will not otherwise be selected during the selection process. For example, a distribution group 26 for a specific Market Leadership Team may not include a contact address for the respective Region Executive. If the Region Executive is to be included in distribution group 26, a user may select a particular user 40 and view the particular user's hierarchy. The Region Executive may then be selected and added to distribution group 26. In a similar manner, users 40 below a selected user 40 in the organizational hierarchy may be selected by viewing the user's 40 hierarchy structure and selecting users 40 below the particular user 40.

Particular embodiments of alert distribution system 10 may utilize search routines that improve performance of distribution group creation compared with previous systems. In particular, by utilizing search routines that are tailored to the particular data used, performance be improved. For example, knowing in advance that certain data may be ordered alphabetically may enable distribution server 20 to more rapidly search or sort data. Additionally, knowing in advance that certain patterns exist in data (such as, for example, emails contain a string of letters followed by an "@" symbol, followed by another string of letters), may enable distribution server 20 to more rapidly search or sort data. As a result, when filtering, searching, and/or sorting data that may contain thousands of individual entries, performance may be improved by utilizing particular embodiments of the present disclosure.

Based on rapid and/or near-real-time performance, users of alert distribution system 10 are able to generate distribution group 26 more efficiently and with accurate information compared with previous methods. Thus, once distribution group 26 is created, a user may send message 35 to users 40 in the generated distribution group 26. As a result distribution group 26 may enable a user to provide a rapid communication response to events.

Accordingly, by efficiently and rapidly generating a real-time customizable distribution group 26, alert distribution system 10 may provide numerous operational benefits. For example, alert distribution system 10 may offer a dynamic query process to produce real time distribution groups. Previous distribution group tools or systems may have required the creation of static lists of information. Static lists of information will tend to become obsolete over time as users move or leave the organization, and as new users join the organization. Criteria that was used to establish the static lists may no longer apply in a current environment. Additionally, static lists are very labor intensive to create and maintain. Moreover, flexibility does not exist to create distribution groups according to specific and varying parameters. Creating distribution groups in real time, however, may ensure accuracy of information, a correct targeted audience, and efficiency. In particular, utilizing alert distribution system 10, distribution groups may be built with the most recent information on users within the organization and the structure of the organization itself. Additionally, distribution groups can be targeted to specific users that require the information. Utilizing alert distribution system 10, distribution groups may be created with the most recent information in a shorter period of time. Alert distribution system 10 may facilitate accurate and timely communication in organizations that include large memberships spread across various functions, geographic location, or organization. Alert distribution system 10 may create distribution groups that include targeted users that have a specific organizational role, title, location, or function. In addition, alert distribution system 10 provides accurate and timely distribution group creation where manual updates to maintain accuracy is impractical. Moreover, in particular embodiments of alert distribution system 10, a user may find the filtered list of users 40 from your category selections. This becomes a valuable way to use the tool when a need to find a unique group of people arises. For example, if a user wanted to find out all associates that work in building 1234 in New York, the user could use the filtering process to find those particular contacts. This may be useful to ensure everyone is accounted for in a building evacuation. Thus, particular embodiments may have the potential to save lives in cases of emergency. Additionally, particular embodiments of the present disclosure may be used to find people in certain job titles that need to take specific training. In general, particular embodiments may enable users to locate other persons in an organization based on selectable and customizable categories and values. As a result, alert distribution system 10 may provide numerous operational benefits. Particular embodiments of alert distribution system 10 may provide some, none, all, or additional operational benefits.

Figure 2:
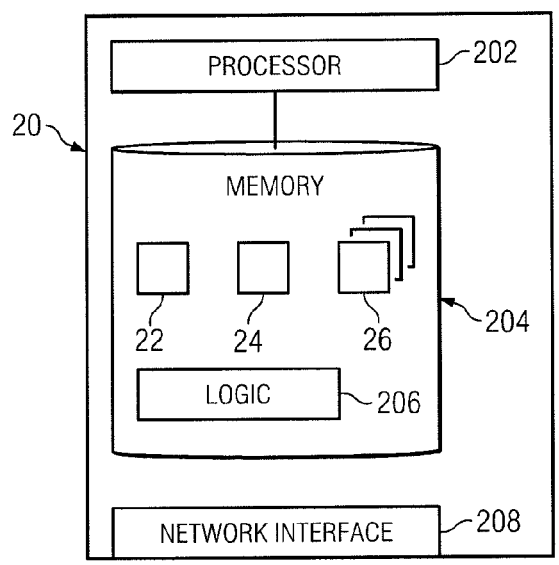
FIG. 2 illustrates a distribution server shown in FIG. 1 in more detail, according to particular embodiments of the present disclosure.

FIG. 2 is a block diagram illustrating aspects of distribution server 20 discussed above with respect to FIG. 1. As discussed above, distribution server 20 receives data containing information associated with users 40 and converts raw data 22 to conditioned data 24 to enable further processing in alert distribution system 10. In particular embodiments, distribution server 20 includes processor 202, memory 204, logic 206, and network interface 208.

Memory 204 comprises any suitable arrangement of random access memory (RAM), read only memory (ROM), magnetic computer disk, CD-ROM, repository, other magnetic or optical storage media, or any other volatile or non-volatile memory device that stores one or more files, lists, tables, or other arrangements of information, such as raw data 22, conditioned data 24, and/or distribution group 26. Although FIG. 2 illustrates memory 204 as internal to distribution server 20, it should be understood that memory 204 may be internal or external to distribution server 20, depending on particular implementations. Memory 204 may be separate from or integral to other memory devices to achieve any suitable arrangement of memory devices for use in alert distribution system 10.

Memory 204 is further operable to store logic 206. Logic 206 generally comprises rules, algorithms, code, tables, and/or other suitable instructions for receiving raw data 22, generating conditioned data 24, storing distribution group 26, transmitting relevant information to and/or from client 30 and/or users 40.

Memory 204 is communicatively coupled to processor 202. Processor 202 is generally operable to execute logic to perform operations described herein. Processor 202 comprises any suitable combination of hardware and software implemented in one or more modules to provide the described function or operation.

Network interface 208 communicates information with one or more networks. For example, network interface 208 may communicate with client 30 over network 50 through network interface 208. A network may include communication using internet protocol packets, frame relay frames, asynchronous transfer mode cells, and/or other suitable information between network addresses. A network may include one or more intranets, local area networks, metropolitan area networks, wide area networks, cellular networks, all or a portion of the Internet, and/or any other communication system or systems at one or more locations.

Figure 3:
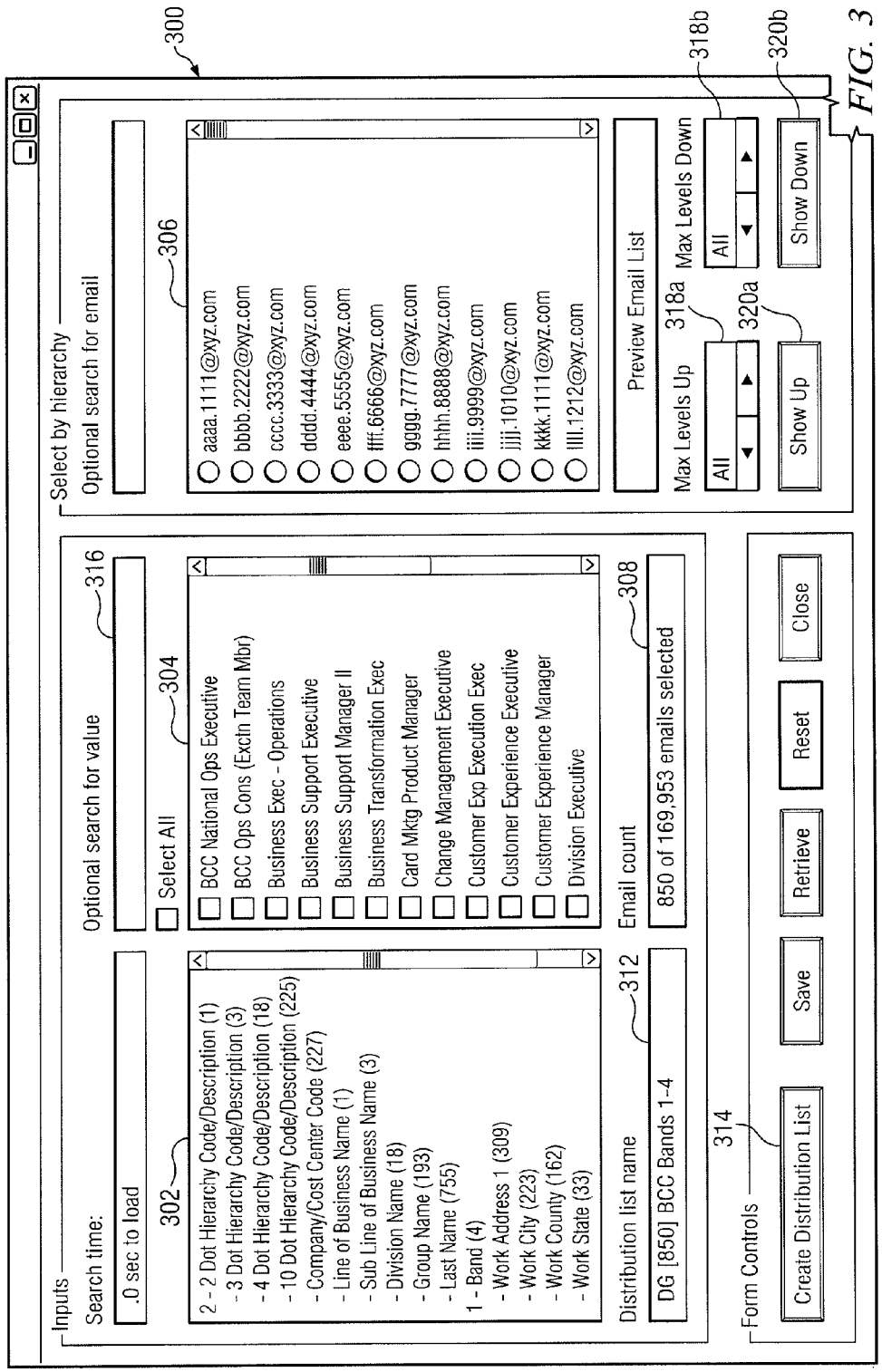
FIG. 3 illustrates an example Graphical User Interface for generating a distribution group, according to particular embodiments of the present disclosure.

FIG. 3 illustrates an example graphical user interface (GUI) 300 that may be utilized in particular embodiments of distribution system 10. For example, a user may utilize GUI 300 to generate distribution group 26 to facilitate communication with users 40.

As shown in FIG. 3, GUI 300 includes category window 302, filter options window 304, and contact list 306. Category window 302 displays a list of pre-defined categories included in conditioned data 24. The number displayed to the right of the category indicates the total number of filter options within the category. In some embodiments, this number changes as results are further refined.

Filter options window 304 displays the filter options available for the selected category. For example, selecting the category "Job Title" in category window 302 displays all job titles in the currently selected categories of data. That is, if no other category is selected, all job titles will be displayed. If another category is selected, job titles that also meet the criteria of the other selected category will be displayed.

Contact list window 306 displays a contact address (such as, for example, an email address or telephone number) for users 40 meeting the criteria selecting using category window 302 and filter options window 304. In some embodiments, contact list window 306 may be configured to display contact addresses associated with users 40 selected by category window 302 and filter options 304. Contact list window 306 may also be configured to display telephone numbers, addresses, and/or any other relevant data associated with users 40 meeting criteria specified by category window 302 and filter options window 304.

Contact count field 308 displays the corresponding number of contacts (such as, for example, email addresses) displayed in the contact list window.

Preview contact list button 310 allows users to view a list of contacts based on the criteria selected. Users may click the preview contact list button at any time throughout the selection process to determine the contacts selected by the relevant criteria.

Distribution group name field 312 allows users to assign a name to the generated distribution group 26. Upon completion of the filtering and selection process, a user may enter the desired name for the distribution group as it will appear in a user's contact management or email application.

Create distribution group button 314 creates distribution group 26 that includes the contacts in contact list window 306. In particular embodiments, the distribution group 26 created will be filed in the user's contacts folder under the name entered in distribution group name field 312.

Optional search value fields 316a and 316b may facilitate the searching of values in filter options window 304 and/or contact list window 306. A user may use optional search value fields 316a and 316b as a shortcut to view information in the list without having to use a scroll bar.

Max level up field 318a and max level down field 318b allow a user to select users 40 that may be above or below a particular user 40 identified in contact list window 306 by using the relevant criteria. To view users 40 above a particular user 40, a user may enter into max level up button 318a a relevant number of steps up the hierarchy, and then click show up button 320a. A window may appear that shows a number of steps above the particular user 40 in the hierarchy. The user may then select the desired user 40 for inclusion in distribution group 26. In a similar way, a user may enter a number into max level down field 318b and select show down button 320b to view users 40 below a particular user 40 in the organization's hierarchy.

Figure 4:
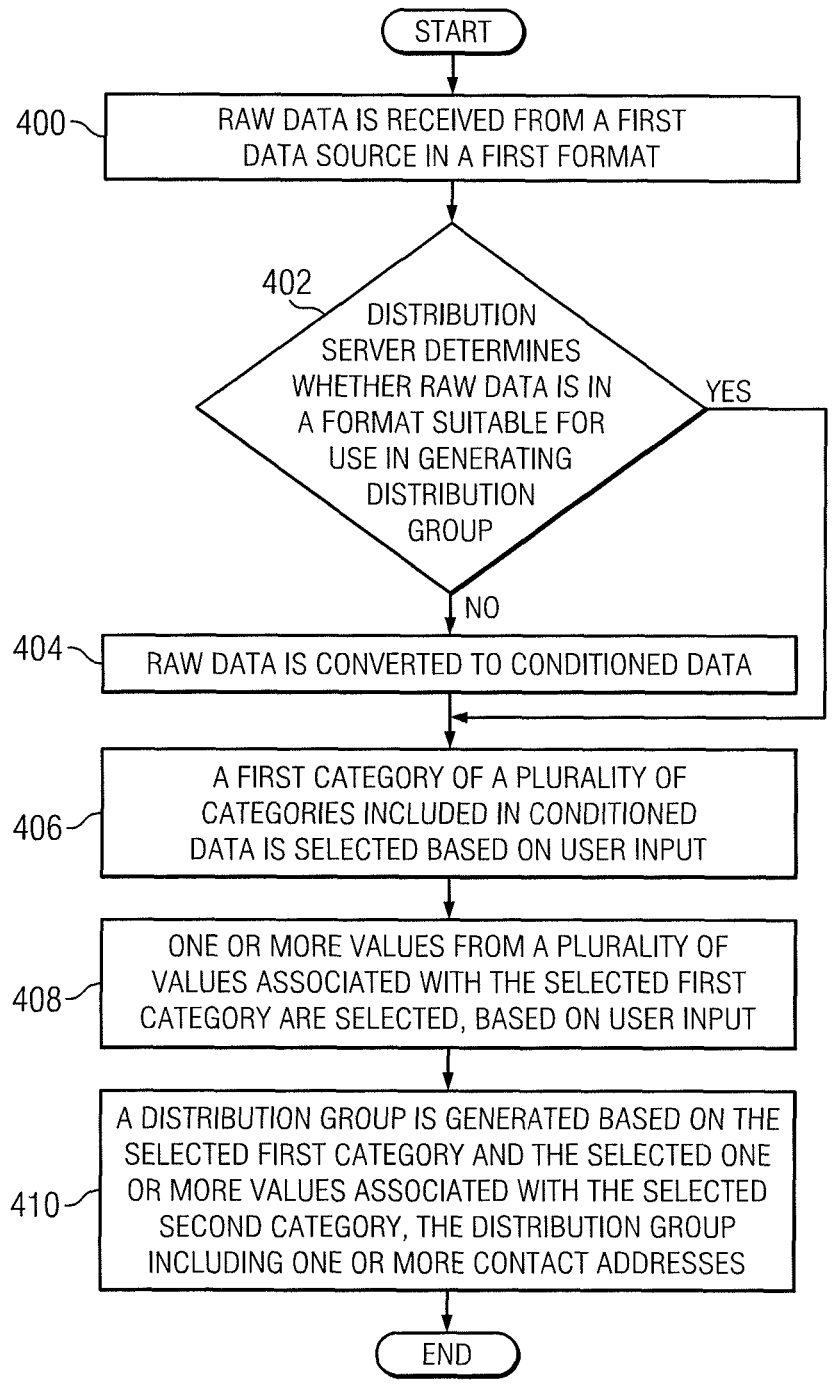
FIG. 4 is a flow diagram illustrating a particular operation of the system of FIG. 1 in accordance with particular embodiments of the present disclosure.

FIG. 4 is a flow diagram illustrating an operation in accordance with a particular embodiment of alert distribution system 10. In the illustrated example, operation begins at step 400, wherein raw data 22 is received from a first data source in a first format. In particular embodiments, raw data 22 may include data received from a human resources database. Raw data 22 may be received weekly, daily, or on an as-needed basis. In particular embodiments, raw data 22 may not be suitable for use in generating distribution groups 26 until converted to a conditioned format. Thus, at step 402, distribution server 20 determines whether raw data 22 is in a format suitable for use in generating distribution group 26. If it is, operation proceeds with step 406. If not, operation proceeds with step 404.

At step 404, raw data 22 is converted to conditioned data 24. Converting raw data 22 may include selectively filtering sensitive data (such as, for example, salary information and/or age of user 40). Converting raw data 22 may include reformatting certain fields in raw data 22 to facilitate further processing within alert distribution system 10. For example, if name information in raw data 22 is stored a Last Name, First Name, converting raw data 22 may include storing name information in conditioned data 24 as First Name, Last Name. In some embodiments, processing raw data 22 may include selectively filtering information based on relevance. For example, a secondary contact number, or a previous address of user 40, may not be relevant to the creation of a distribution group.

At step 406, a first category of a plurality of categories included in conditioned data 24 is selected based on user input. Client 30 and/or distribution server 20 may generate distribution group 26 by selecting categories of information associated with users 40 in a user interface. A user operating client 30 may select one or more categories displayed in a category window in a user interface. Based on the user selection, client 30 and/or distribution server may select a category included in conditioned data 24. For example, to generate a message to all users in California, client 30 may select in a category window "Work State." Each category may include one or more values. For example, the category "Work State" may include all values representing states in which users 40 within the organization work.

At step 408, one or more values from a plurality of values associated with the selected first category are selected, based on user input. For example, selecting "Work State," as discussed above, may enable a user to select additional values for data that populate the "Work State" category. For example, a user interface may display all states in which users 40 in the organization are located, which populate the "Work State" category. More than one value may be selected. Selecting "California" at this point may display all contact addresses for users 40 in the organization that are located in California. Client 30 may select additional categories and values. For example, a user may select "Job Title" whereupon the user interface displays all values that populate the "Job Title" category, such as "Business executive", "Associate", or "Group Operations Manager." Selecting one or more job titles may display contact address of users 40 within the organization that have the selected job title and are located in California. Additional categories and values may be selected, resulting in a distribution group 26 that includes the users 40 desired to be communicated with.

At step 410, a distribution group 26 is generated based on the selected first category and the selected one or more values associated with the selected second category, the distribution group 26 including one or more contact addresses. In particular embodiments, a user may select a "Create Distribution Group" button. Based on the selection, client 30 and/or distribution server 20 may create distribution group 26 that includes contact addresses based on the selected categories and values. In some embodiments, the generated distribution group 26 may be imported into a contact management and/or email application, whereby a user may communicate message 35 to users 40 included in distribution group 26.

The steps illustrated in FIG. 4 may be combined, modified, or deleted where appropriate, and additional steps may also be added to those shown. Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for generating a distribution group comprising:
a memory operable to:
store raw data received from a first data source in a first format, the raw data comprising contact data associated with a plurality of users including a first user; and
a processor operable to:
convert the stored raw data to conditioned data, wherein converting the stored raw data comprises filtering predetermined data from the contact data associated with the first user to prevent access to the predetermined data by a second user of a client;
provide access to the conditioned data associated with the first user that does not include the predetermined data to the second user of the client;
select, based on input received from the client, a first category of a plurality of categories included in the conditioned data;
select, based on input received from the client, one or more values from a plurality of values associated with the selected first category; and
generate a distribution group based on the selected first category and the selected one or more values, the distribution group including one or more contact addresses.

2. The system of claim 1, wherein the processor is operable to convert the raw data to conditioned data by:
converting the raw data to a second format suitable for use by the client.

3. The system of claim 1, wherein the processor is further operable to:
select, based on input received from the client, a second category of the plurality of categories included in the conditioned data; and
select, based on input received from the client, one or more values from a plurality of values associated with the selected second category.

4. The system of claim 1, wherein the client is operable to:
display, based on the selected first category and the selected one or more values, the one or more contact addresses included in the generated distribution group.

5. The system of claim 4, wherein the client is further operable to:
select one of the one or more contact addresses associated with the selected first category and the selected one or more values;
receive input indicating a maximum number of contact addresses below the selected contact address in an organization structure to display;

based on the received input, display a selected number of contact addresses below the selected contact in the organization; and select one of the selected number of contact addresses below the selected contact address in the organization; and wherein the processor is further operable to generate the distribution group based on the selected one of the selected number of contact addresses below the selected contact address in the organization.

6. The system of claim 1, wherein filtering predetermined data from the received raw data comprises removing sensitive data from the received raw data to prevent access to the sensitive data by the user of the client.

7. The system of claim 1, wherein filtering predetermined data from the received raw data comprises selectively filtering information based on relevance to prevent access to irrelevant data by the user of the client.

8. A system for generating a distribution group comprising:
a memory operable to:
store raw data received from a first data source in a first format; and
a processor operable to:
convert the stored raw data to conditioned data
select, based on input received from a client, a first category of a plurality of categories included in the conditioned data;
select, based on input received from the client, one or more values from a plurality of values associated with the selected first category;
display, based on the selected first category and the selected one or more values, the one or more contact addresses included in the generated distribution group;
select one of the one or more contact addresses associated with the selected first category and the selected one or more values;
receive input indicating a maximum number of contact addresses above the selected contact address in an organization structure to display; and
based on the received input, display a selected number of contact addresses above the selected contact in the organization; and
generate a distribution group based on the selected first category and the selected one or more values, the distribution group including one or more contact addresses, wherein the processor is further operable to generate the distribution group based on the selected one of the selected number of contact addresses above the selected contact address in the organization.

9. A method for generating a distribution group comprising:
receiving, by a distribution server comprising a processor, raw data from a first data source in a first format, the raw data comprising contact data associated with a plurality of users including first user;
converting, by the distribution server, the raw data to conditioned data, wherein converting the stored raw data comprises filtering predetermined data from the contact data associated with the first user to prevent access to the predetermined data by a second user of a client;
providing access to the conditioned data associated with the first user that does not include the predetermined data to the second user of the client;
selecting, based on user input, a first category of a plurality of categories included in the conditioned data;

selecting, based on user input, one or more values from a plurality of values associated with the selected first category; and generating a distribution group based on the selected first category and the selected one or more values associated with the selected first category, the distribution group including one or more contact addresses.

10. The method of claim 9, wherein converting the raw data to conditioned data comprises:
converting the raw data to a second format suitable for use by a client.

11. The method of claim 9, further comprising:
selecting, from the conditioned data a second category from the plurality of categories included in the conditioned data;
selecting one or more values from the plurality of values associated with the selected second category; and
wherein generating the distribution group further comprises generating the distribution group based on the selected second category and the selected one or more values associated with the selected second category.

12. The method of claim 9, further comprising:
displaying, based on the selected first category and the selected one or more values, one or more contact addresses associated with the selected first category and the selected one or more values.

13. The method of claim 12, further comprising:
selecting one of the one or more contacts associated with the selected first category and the selected one or more values;
receiving input indicating a maximum number of contact addresses above the selected contact in an organization structure to display;
based on the received input, displaying a selected number of contact addresses above the selected contact in the organization; and
selecting one of the selected number of contact addresses above the selected contact in the organization; and
wherein generating the distribution group further comprises generating the distribution group based on the selected one of the selected number of contact addresses above the selected contact address in the organization.

14. The method of claim 12, further comprising:
selecting one of the one or more contacts associated with the selected first category and the selected one or more values;
receiving input indicating a maximum number of contact addresses below the selected contact in an organization structure to display;
based on the received input, displaying a selected number of contact addresses below the selected contact in the organization; and
selecting one of the selected number of contact addresses below the selected contact in the organization; and
wherein generating the distribution group comprises generating the distribution group based on the selected one of the selected number of contact addresses below the selected contact address in the organization.

15. The method of claim 9, wherein filtering predetermined data from the received raw data comprises removing sensitive data from the received raw data to prevent access to the sensitive data by the user of the client.

16. The method of claim 9, wherein filtering predetermined data from the received raw data comprises selectively filtering information based on relevance to prevent access to irrelevant data by the user of the client.

17. A non-transitory computer readable medium comprising logic, the logic operable, when executed on a processor to:
  receive raw data from a first data source in a first format, the raw data comprising contact data associated with a plurality of users including a first user;
  convert the raw data to conditioned data, wherein converting the stored raw data comprises filtering predetermined data from the contact data associated with the first user to prevent access to the predetermined data by a user of a client;
  provide access to the conditioned data associated with the first user that does not include the predetermined data to the second user of the client;
  select, based on input received from the client, a first category of a plurality of categories included in the conditioned data;
  select, based on input received from the client, one or more values from a plurality of values associated with the selected first category; and
  generate a distribution group based on the selected first category and the selected one or more values, the distribution group including one or more contact addresses.

18. The non-transitory computer readable medium of claim 17, wherein the logic is operable to convert the raw data to conditioned data by:
  filtering predetermined data from the received raw data; and
  converting the raw data to a second format suitable for use by the client.

19. The non-transitory computer readable medium of claim 17, Wherein the logic is further operable to:
  select, based on input received from the client, a second category of the plurality of categories included in the conditioned data; and
  select, based on input received from the client, one or more values from a plurality of values associated with the selected second category.

20. The non-transitory computer readable medium of claim 17, wherein the logic is further operable to:
  display, based on the selected first category and the selected one or more values, the one or more contact addresses included in the generated distribution group.

21. The non-transitory computer readable medium of claim 20, wherein the logic is further operable to:
  select, based on user input, one of the one or more contact addresses associated with the selected first category and the selected one or more values;
  receive input indicating a maximum number of contact addresses above the selected contact address in an organization structure to display;
  based on the received input, display a selected number of contact addresses above the selected contact in the organization; and
  generate the distribution group based on the selected one of the selected number of contact addresses above the selected contact address in the organization.

22. The non-transitory computer readable medium of claim 20, wherein the logic is further operable to:
  select, based on user input, one of the one or more contact addresses associated with the selected first category and the selected one or more values;
  receive input indicating a maximum number of contact addresses below the selected contact address in an organization structure to display;
  based on the received input, display a selected number of contact addresses below the selected contact in the organization;
  select one of the selected number of contact addresses below the selected contact address in the organization; and
  generate the distribution group based on the selected one of the selected number of contact addresses below the selected contact address in the organization.

23. The non-transitory computer readable medium of claim 17, wherein filtering predetermined data from the received raw data comprises removing sensitive data from the received raw data to prevent access to the sensitive data by the user of the client.

24. The non-transitory computer readable medium of claim 17, wherein filtering predetermined data from the received raw data comprises selectively filtering information based on relevance to prevent access to irrelevant data by the user of the client.

* * * * *